(12) United States Patent
Devarakonda et al.

(10) Patent No.: US 8,230,677 B2
(45) Date of Patent: Jul. 31, 2012

(54) $NO_x$ CONTROL SYSTEMS AND METHODS FOR CONTROLLING $NO_x$ EMISSIONS

(75) Inventors: Maruthi Devarakonda, Richland, WA (US); Gordon Parker, Houghton, MI (US); John Johnson, Houghton, MI (US)

(73) Assignee: Michigan Technological University, Houghton, MI (US)

( * ) Notice: Subject to any disclaimer, the term of this patent is extended or adjusted under 35 U.S.C. 154(b) by 909 days.

(21) Appl. No.: 12/324,533

(22) Filed: Nov. 26, 2008

(65) Prior Publication Data

US 2009/0133384 A1 May 28, 2009

Related U.S. Application Data

(60) Provisional application No. 60/990,211, filed on Nov. 26, 2007, provisional application No. 61/052,759, filed on May 13, 2008.

(51) Int. Cl.
*F01N 3/00* (2006.01)
(52) U.S. Cl. ............ 60/286; 60/276; 60/295; 60/301
(58) Field of Classification Search .......... 60/276, 60/286, 282, 274, 301
See application file for complete search history.

(56) References Cited

U.S. PATENT DOCUMENTS

| | | | |
|---|---|---|---|
| 6,701,707 B1 * | 3/2004 | Upadhyay et al. | 60/277 |
| 7,093,427 B2 | 8/2006 | Van Nieuwstadt et al. | |
| 7,134,273 B2 * | 11/2006 | Mazur et al. | 60/286 |
| 7,178,328 B2 * | 2/2007 | Solbrig | 60/286 |
| 7,272,924 B2 | 9/2007 | Itoh et al. | |
| 2002/0148220 A1 | 10/2002 | Patchett et al. | |
| 2003/0213234 A1 | 11/2003 | Funk et al. | |
| 2004/0098968 A1 | 5/2004 | Van Nieuwstadt et al. | |
| 2004/0128982 A1 * | 7/2004 | Patchett et al. | 60/274 |
| 2005/0129601 A1 * | 6/2005 | Li et al. | 423/239.2 |
| 2007/0119153 A1 * | 5/2007 | Pierz et al. | 60/286 |
| 2007/0137181 A1 | 6/2007 | Upadhyay et al. | |

FOREIGN PATENT DOCUMENTS

WO 2009/070734 6/2009

OTHER PUBLICATIONS

International Preliminary Report on Patentability for Application No. PCT/US08/84980 dated Jan. 28, 2010 (7 pages).
Moos, "Selective ammonia exhaust gas sensor for automotive applications," Sensors and Actuators B (2002) 83:181-189.
Upadhyay, D. et al., "Model based analysis and control design of a urea-SCR deNOx aftertreatment system," ASME Journal of Dynamic Systems, Measurement and Control (2006) 128:737-741.
Wang, D.Y., "Ammonia sensor for SCR NOX reduction," Diesel Engine-Efficiency and Emissions Research • (DEER) conference presentation, Detroit, Michigan (Aug. 13-16, 2007) 1-20.
International Search Report and Written Opinion of Application No. PCT/US2008/084980 dated Jan. 29, 2009 (6 pages).

* cited by examiner

*Primary Examiner* — Thomas Denion
*Assistant Examiner* — Jesse Bogue
(74) *Attorney, Agent, or Firm* — Michael Best & Friedrich LLP

(57) ABSTRACT

An exhaust aftertreatment system comprising a selective reduction catalyst, a $NO_x$ sensor or an $NH_3$ sensor, a urea injector, and a dosing control unit, wherein the dosing control unit calculates the rate of urea injection by estimating the concentrations of NO and $NO_2$ in the exhaust downstream of the SCR catalyst.

11 Claims, 10 Drawing Sheets

$NO_x$ CONTROL SYSTEMS AND METHODS FOR CONTROLLING $NO_x$ EMISSIONS

CROSS-REFERENCE TO RELATED APPLICATIONS

This application claims priority to U.S. Provisional Patent Applications Ser. Nos. 60/990,211, filed Nov. 26, 2007, and 61/052,759, filed May 13, 2008, both of which are incorporated herein by reference in their entirety.

FIELD OF INVENTION

The present invention relates to methods for reducing nitrogen oxide emissions from combustion processes. In particular, the invention relates to the use of catalysts in combination with an ammonia-precursor injector to reduce nitrogen oxide emissions from engines, such as those used by diesel-powered vehicles, equipment, and generators.

BACKGROUND

Nitrogen oxides ($NO_x$) are a well-known class of atmospheric pollutants that pose risks to human health, agriculture, and property. Nitrogen oxides are key ingredients in the formation of photochemical smog, which damages respiratory functions and limits visibility. Additionally, nitrogen oxides form nitric acid when they react with moisture in the atmosphere, thus forming acid rain. They are also involved in the production of tropospheric ozone. Environmental agencies around the world have instituted standards for nitrogen oxide control in an effort to reduce nitrogen oxides' harmful effects.

Nitrogen oxides broadly include compounds such as $NO_3$ and $N_2O_5$, but the bulk of atmospheric nitrogen oxides are $N_2O$, $NO$ and $NO_2$. When dealing with reactive atmospheric nitrogen, it is often sufficient to deal only with $NO$ and $NO_2$. (See Seinfeld and Pandis, *Atmospheric Chemistry and Physics*.)

While there are some natural sources of $NO_x$, most of the $NO_x$ in urban environments is a by-product of fossil-fuel combustion. At temperatures found in engines, free-radical chemistry converts atmospheric nitrogen into nitrogen oxides. In particular, lean burning internal combustion engines, such as those used in diesel-powered vehicles, may produce $NO_x$ at a many parts-per-million level. While combustion processes typically produce more $NO$ than $NO_2$, the two easily interconvert in the presence of oxygen species. Thus, an effective emission control systems must account for both species. Additionally, $NO_2$-producing processes present a greater health risk than $NO$-producing processes, as is reported in the literature.

In view of the health risks posed by atmospheric $NO_x$, the U.S. Environmental Protection Agency regulates acceptable levels of $NO_x$ emissions for U.S. cars and trucks.

SUMMARY OF THE INVENTION

In one embodiment, the invention comprises an exhaust aftertreatment control system for exhaust gases. The exhaust aftertreatment control system comprises a selective catalytic reduction (SCR) catalyst in fluid communication with an exhaust stream from an engine, a urea solution injector, upstream of the SCR catalyst, in fluid communication with the exhaust stream, a gas sensor, downstream of the SCR catalyst, in fluid communication with the exhaust stream, a diagnostic unit, operatively connected to the engine, and a dosing control unit, operatively connected to the gas sensor, the urea solution injector, and the diagnostic unit. The dosing control unit receives a signal indicative of $NO$, $NO_2$ or $NH_3$ concentrations from the gas sensor, receives a signal indicative of engine parameters from the diagnostic unit, converts the engine parameters to $NO$ and $NO_2$ concentrations, estimates $NO$ and $NO_2$ concentrations downstream from the SCR catalyst, estimates the fractional surface coverage of $NH_3$ in the SCR catalyst, calculates a quantity of urea solution needed to minimize $NO_x$ emissions, and signals the urea solution injector to inject the quantity of the urea solution into the exhaust stream.

In another embodiment, the invention comprises a method for controlling emission of $NO_x$ from an engine with an exhaust aftertreatment system having a $NO_x$ sensor. The method comprises inputting engine parameters into a dosing control unit, measuring $NO_x$ concentration in the exhaust, estimating $NO$ and $NO_2$ concentrations in the exhaust using the engine parameters and the measured $NO_x$ concentration, estimating fractional surface coverage of $NH_3$ in the catalyst, calculating an amount of urea solution needed to minimize $NO_x$ emissions using the estimate of $NO$ and $NO_2$ concentrations in the exhaust and the estimate of fractional surface coverage of $NH_3$ in the catalyst, and injecting an amount of urea solution.

In another embodiment, the invention comprises a method for controlling emission of $NO_x$ from an engine with an exhaust aftertreatment system having a $NH_3$ sensor. The method comprises inputting engine parameters into a dosing control unit, measuring $NH_3$ concentration in the exhaust, estimating $NO$ and $NO_2$ concentrations in the exhaust using the engine parameters and the measured $NH_3$ concentration, estimating fractional surface coverage of $NH_3$ in the catalyst, calculating an amount of urea solution needed to minimize $NO_x$ emissions using the estimate of $NO$ and $NO_2$ concentrations in the exhaust and the estimate of fractional surface coverage of $NH_3$ in the catalyst, and injecting an amount of urea solution.

In another embodiment, the invention comprises an exhaust aftertreatment control system for exhaust gases from an industrial burner. The burner may be fueled with a variety of fuels, including natural gas, heating oil, biomass, or municipal solid waste. The exhaust aftertreatment control system comprises a selective catalytic reduction (SCR) catalyst in fluid communication with an exhaust stream from a burner, a urea solution injector, upstream of the SCR catalyst, in fluid communication with the exhaust stream, a gas sensor, downstream of the SCR catalyst, in fluid communication with the exhaust stream, a diagnostic unit, operatively connected to the burner, and a dosing control unit, operatively connected to the gas sensor, the urea solution injector, and the diagnostic unit. The dosing control unit receives a signal indicative of $NO$, $NO_2$ or $NH_3$ concentrations from the gas sensor, receives a signal indicative of burner parameters from the diagnostic unit, converts the burner parameters to $NO$ and $NO_2$ concentrations, estimates $NO$ and $NO_2$ concentrations downstream from the SCR catalyst, estimates the fractional surface coverage of $NH_3$ in the SCR catalyst, calculates a quantity of urea solution needed to minimize $NO_x$ emissions, and signals the urea solution injector to inject the quantity of the urea solution into the exhaust stream.

Other aspects of the invention will become apparent by consideration of the detailed description and accompanying drawings.

DETAILED DESCRIPTION

Figure 1:
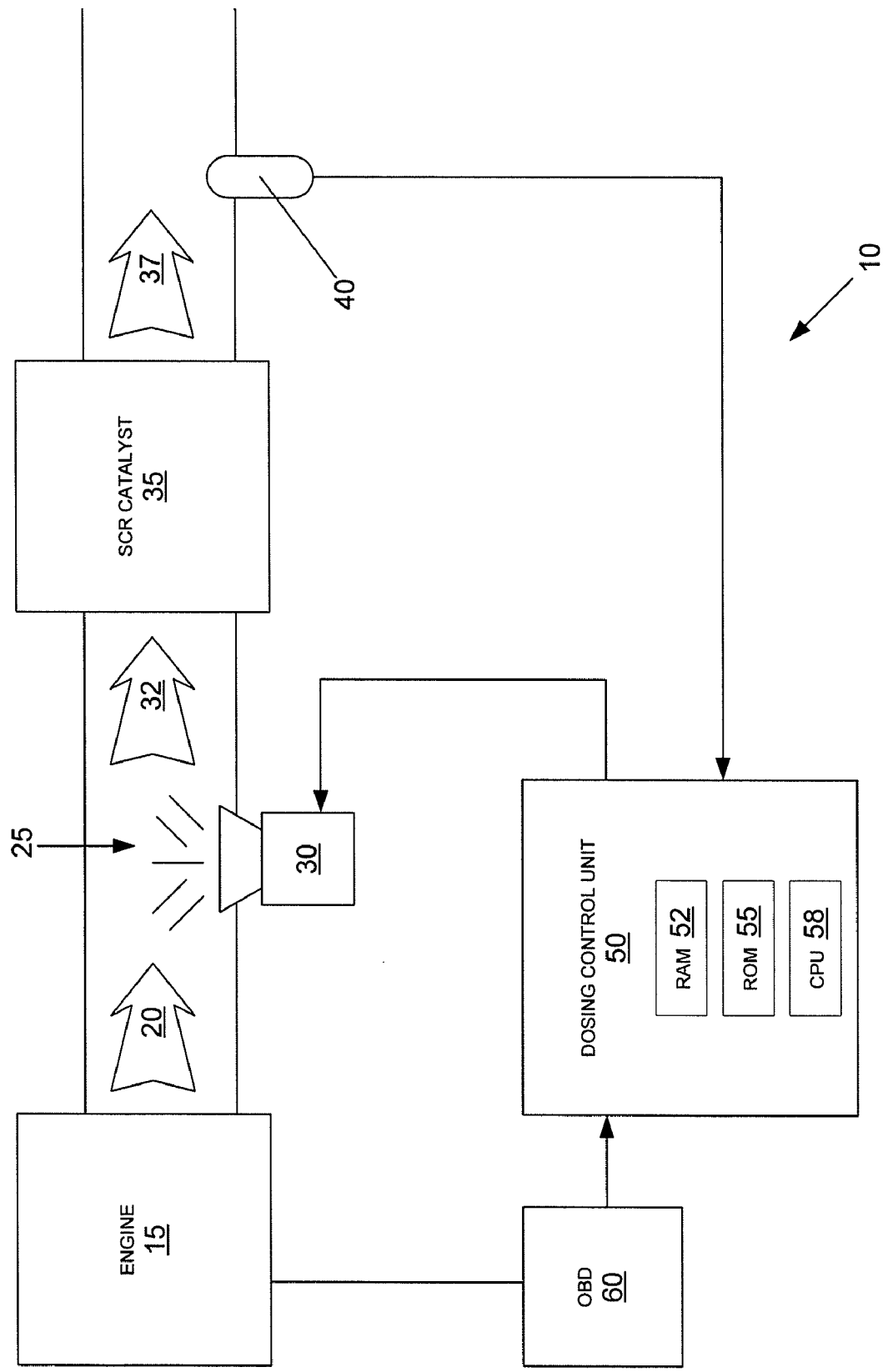
FIG. 1 is a block diagram of an embodiment of an exhaust aftertreatment control system using a $NO_x$ sensor.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. While the following detailed description describes the invention through reference to embodiments involving an internal combustion engine exhaust treatment system, it should be understood that other systems, both stationary and mobile, where exhaust is treated for $NO_x$ emissions, may also be suitable for a use in accordance with principles of the invention.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Further, no admission is made that any reference, including any patent or patent document, cited in this specification constitutes prior art. In particular, it will be understood that, unless otherwise stated, reference to any document herein does not constitute an admission that any of these documents form part of the common general knowledge in the art in the United States or in any other country. Any discussion of the references states what their authors assert, and the applicant reserves the right to challenge the accuracy and pertinency of any of the documents cited herein.

One approach for controlling $NO_x$ emissions from combustion processes involves adding ammonia ($NH_3$) to $NO_x$ in the presence of a catalyst to reduce the $NO_x$ to nitrogen and water. This process, known as selective catalytic reduction (SCR), is described with the balanced equation:

A number of known catalysts may be used in the selective reduction process. See, for example, U.S. Pat. No. 5,451,387, which describes catalysts that may be used for this application.

Unfortunately, ammonia poses its own risks to human health and the environment. Ammonia is caustic, and irritates the lungs. Excess ammonia released into the environment often finds its way into the water system, where it threatens the health of plants and animals that contact the water. Because of this risk, selective catalytic reduction with ammonia requires careful monitoring of ammonia emissions as well as $NO_x$ emissions. The unintended release of ammonia is known as ammonia "slip."

For large-scale applications, such as power plants, compressed ammonia gas is used for the catalytic reduction of $NO_x$ to nitrogen and water. However, for small-scale or mobile processes, it is often impractical to store/transport ammonia gas for selective catalytic reduction. In some small-scale systems, it is feasible to use highly concentrated ammonia solutions. Highly concentrated ammonia solutions are caustic, however, and present storage and handling issues.

Urea ($NH_2CONH_2$) solutions provide a suitable alternative to ammonia gas or ammonia solutions for SCR-based $NO_x$ control systems. In a urea SCR system, an aqueous urea solution is injected into a hot exhaust stream, where the urea thermally decomposes into ammonia and carbon dioxide. The resultant ammonia mixes with the exhaust gas prior to entering a catalytic unit where the $NO_x$ is converted to nitrogen and water. Because urea solutions are unreactive, many of the storage and handling concerns are alleviated.

Urea-SCR systems have seen limited use in diesel trucks and diesel-powered marine vessels. Commercially-available urea-SCR systems typically comprise a urea injector (Bosch GmbH, Stuttgart, Germany), an SCR catalyst, and a $NO_x$ sensor (Siemens VGO Trading Ltd., Schwalbach, Germany). State of the art systems employ a rudimentary look-up table based upon engine parameters to provide a guess for the appropriate urea injection rate. These look-up tables are often subject to error due to engine load and exhaust temperature. The $NO_x$ sensor provides feedback as to when the system is exceeding $NO_x$ limits, allowing the injection rate to be adjusted in an iterative fashion. Alternatively, or in addition, an $NH_3$ sensor may be used to provide feedback to minimize the amount of ammonia slip.

Because the current systems do not model the catalytic reactions in real time, current systems use more urea solution than necessary and have unacceptable levels of ammonia slip. Additionally, the current systems may be ineffective for controlling NOx emissions for vehicles that stop and start frequently, e.g., busses and garbage trucks.

The German Association of the Automobile Industry has championed urea-SCR $NO_x$ control, and advocates for a network of filling stations where diesel vehicles can replenish urea solutions. Suitable urea solutions are now commercially-available throughout Europe under the trade name AdBlue. AdBlue solutions comprise 32.5% urea in deionized water, and are sold by BASF, Yara, and GreenChem, among others. These solutions typically cost $4-7/gal. The rate of consumption varies tremendously depending upon the type of engine and the loading, however, it is not uncommon for an engine to consume 5 gallons of urea solution for each 100 gallons of diesel consumed. The high cost of urea solutions is motivating equipment manufacturers to maximize $NO_x$ control per unit of solution.

The invention described herein provides a closed-loop system for minimizing $NO_x$ emissions from combustion processes while minimizing the consumption of urea solution and producing negligible ammonia slip. In one embodiment, the aftertreatment system comprises a selective catalytic reduction (SCR) unit, a urea injector, a gas sensor, and a dosing control unit. The gas sensor is sensitive to one or more gases that are to be controlled, including, but not limited to, NO, $NO_2$, or $NH_3$. The catalyst within the SCR unit facilitates the conversion of ammonia and $NO_x$ to nitrogen and water. The catalyst may comprise any of a number of catalysts known to work for selective catalytic reduction, including, but not limited to, compounds of vanadium, iron, or copper, and metal zeolites. The urea injector is responsive to the dosing control unit which regulates the concentration of ammonia in the SCR unit by increasing or decreasing the rate of urea injection.

In one embodiment, the gas sensor is a $NO_x$ sensor. The $NO_x$ sensor provides $NO_x$ concentrations to a dosing control unit, thus allowing the dosing control unit to estimate the NO, and $NO_2$ concentrations upstream from the SCR. In an alternate embodiment, the gas sensor is an $NH_3$ sensor that provides the $NH_3$ concentration to the dosing control unit, thus allowing the dosing control unit to estimate the NO, and $NO_2$ concentrations upstream from the SCR. In both embodiments, the dosing control unit is capable of calculating the optimum urea injection rate to minimize $NO_x$ emissions with minimal ammonia slip.

In many embodiments, the dosing control unit is suitably a single electronic unit. Nonetheless, the dosing control unit can be functionally described as comprising two components, an estimator and a controller. Using engine or burner operating parameters and total $NO_x$ or total $NH_3$ output, the estimator employs a mathematical model to estimate the concentrations of NO, $NO_2$, and $NH_3$ downstream from the SCR catalyst as well as the fractional surface coverage of $NH_3$ within the SCR catalyst. The estimator then passes these estimates to the controller which calculates the amount of $NH_3$ needed to minimize $NO_x$ output with minimal $NH_3$ slip. Having calculated the optimum $NH_3$ concentration, the controller then directs the urea injector to inject urea at an appropriate rate.

FIG. 1 is a block diagram of an embodiment of an exhaust aftertreatment system 10 employing a $NO_x$ sensor according to the principles of the invention. The exhaust aftertreatment system 10 includes a urea injector 30, a selective catalytic reduction (SCR) catalyst 35, a $NO_x$ sensor 40, and a dosing control unit 50. An internal combustion engine 15 produces an exhaust stream 20 containing nitrogen oxides, including NO and $NO_2$. As exhaust stream 20 moves through aftertreatment system 10, exhaust stream 20 is mixed with an atomized urea solution 25 from urea injector 30 to create urea-enriched exhaust 32. Urea-enriched exhaust 32 then enters SCR catalyst 35. SCR catalyst 35 contains metal zeolites arranged in a honeycomb such that the passing exhaust gasses will interact with a multitude of catalytic sites. As urea-enriched exhaust 32 is swept into SCR catalyst 35, the urea breaks down into ammonia ($NH_3$) and carbon dioxide ($CO_2$). Once inside SCR catalyst 35, the nitrogen oxides react with ammonia in the presence of the metal zeolite to produce nitrogen gas ($N_2$) and water vapor ($H_2O$). $NO_x$ sensor 40 measures the $NO_x$ in a scrubbed exhaust stream 37 exiting SCR catalyst 35, and provides a signal indicating the concentration of $NO_x$ to dosing control unit 50. Dosing control unit 50 uses the measured $NO_x$ concentration, as well as operating parameters from engine 15, which originate from an onboard diagnostic unit (OBD) 60. Operating parameters may include exhaust gas temperature, speed, load, air-flow rate, fuel-flow rate and/or exhaust gas pressure. Dosing control unit 50 then calculates the rate at which atomized urea solution 25 should be mixed with exhaust stream 20, and adjusts urea injector 30 accordingly.

Figure 2:
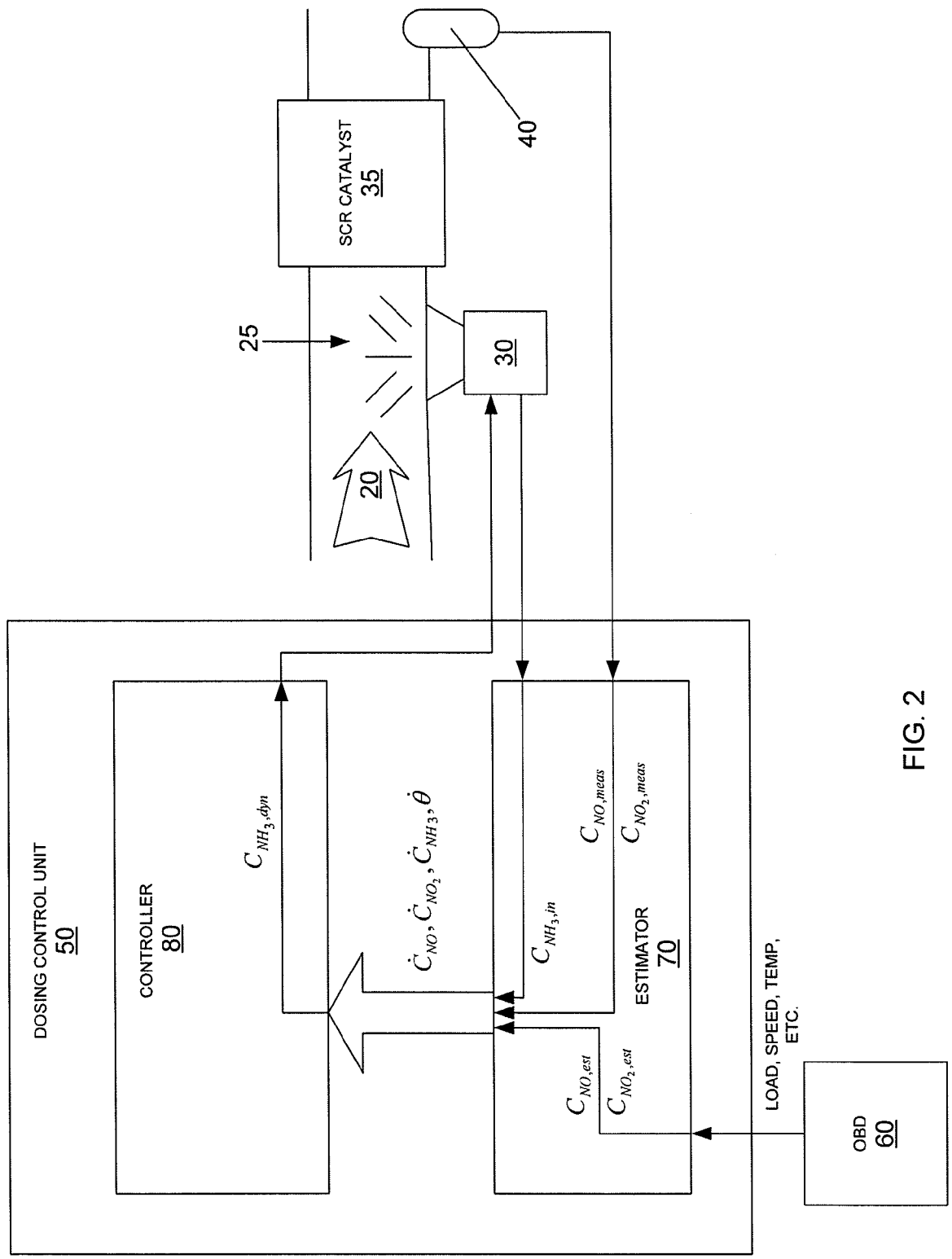
FIG. 2 is a block diagram of an embodiment of a dosing control unit for the exhaust aftertreatment control system of FIG. 1.

Dosing control unit 50 is an electronic control unit comprising random access memory (RAM) 52, read only memory (ROM) 55, and a microprocessor (CPU) 58. Functionally, dosing control unit 50 may be described as comprising an estimator 70 and a controller 80, as shown in FIG. 2. Estimator 70 collects information about the engine from OBD 60, as well as information from $NO_x$ sensor 40. Using this information, estimator 70 estimates the concentration of NO, $NO_2$, and $NH_3$ in exhaust stream 20, prior exhaust stream 20 entering SCR catalyst 35. Estimator 70 also estimates the $NH_3$ loading, $\theta$, in the catalyst using equation VIII, discussed hereafter. Controller 80 then uses the estimated $NH_3$ loading and the NO, $NO_2$ and $NH_3$ concentrations as inputs to equation XIV, described hereafter. Controller 80 then adjusts the rate at which atomized urea solution 25 is injected exhaust stream 20 to minimize NO, $NO_2$ and $NH_3$ emissions in scrubbed exhaust stream 37.

The estimator employs a four-state model to estimate the concentrations of NO, $NO_2$ and $NH_3$ within SCR catalyst 35. The four-state model encompasses six chemical equations (I-VI) which describe the simultaneous reactions within SCR catalyst 35

$$4NH_3 + 2NO + 2NO_2 \rightarrow 4N_2 + 6H_2O \quad \text{(I)}$$

$$4NH_3 + 4NO + O_2 \rightarrow 4N_2 + 6H_2O \quad \text{(II)}$$

$$4NH_3 + 3NO_2 \rightarrow 7/2 N_2 + 6H_2O \quad \text{(III)}$$

$$4NH_3 + 3O_2 \rightarrow 2N_2 + 3H_2O \quad \text{(IV)}$$

$$NH_3 + S \rightarrow NH_3^* \quad \text{(V)}$$

$$NH_3^* \rightarrow NH_3 + S \quad \text{(VI)}$$

wherein S represents the free active sites in the catalyst, and $NH_3^*$ is $NH_3$ adsorbed at an active site in the catalyst. Incorporating the appropriate rate constants for chemical reactions I-VI, the time-dependent states of NO, $NO_2$, $NH_3$, and the ammonia storage in the catalyst can be represented as $$\dot{C}_{NO} = -\overline{Q}C_{NO} - k_1 \Omega \theta C_{NO} C_{NO_2} - k_2 \Omega \theta C_{NO} C_{O_2} + \overline{Q} C_{NO,in}$$

$$\dot{C}_{NO_2} = -\overline{Q}C_{NO_2} - k_1 \Omega \theta C_{NO} C_{NO_2} - k_3 \Omega \theta C_{NO_2} + \overline{Q} C_{NO_2,in}$$

$$\dot{\theta} = -(k_6 + k_4)\theta + k_5 C_{NH_3} - k_1 C_{NO} C_{NO_2} \theta - k_2 C_{NO} C_{O_2} \theta - k_3 C_{NO_2} \theta - k_5 \theta C_{NH_3}$$

$$\dot{C}_{NH_3} = k_6 \Omega \theta - (k_5 \Omega + \overline{Q}) C_{NH_3} + k_5 \Omega \theta C_{NH_3} + \overline{Q} k_5 C_{NH_3,in} \quad \text{(VII)}$$

wherein $\overline{Q}$ is the normalized flow rate into the SCR catalyst 35 in $sec^{-1}$, wherein $\overline{Q} = Q/V$, and Q is the actual volumetric flow rate in actual $m^3/sec$, and V is the volume of the exhaust gas in the substrate channel in $m^3$, $C_i$ is the concentration of species i in $moles/m^3$, where i=NO, $NO_2$, $NH_3$, or $O_2$, $C_{i,in}$ is the concentration of species i entering SCR catalyst 35, where i=NO, $NO_2$, $NH_3$, $\theta$ is the fractional surface coverage of SCR catalyst 35 by $NH_3$, $\Omega$ is SCR catalyst 35 adsorption capacity in moles of $NH_3/m^3$, $k_1$ is the rate constant for equation I, $k_2$ is the rate constant for equation II, $k_3$ is the rate constant for equation III, $k_4$ is the rate constant for equation IV, $k_5$ is the rate constant for equation V, $k_6$ is the rate constant for equation VI.

In one embodiment, an estimator would employ a converging linear state equation of the form $$\begin{Bmatrix} \dot{C}_{NO,est} \\ \dot{C}_{NO_2,est} \\ \dot{\theta}_{est} \\ \dot{C}_{NH_3,est} \end{Bmatrix} = \vec{f}(C_{NO,est}, C_{NO_2,est}, \theta_{est}, C_{NH_3,est}, C_{NO,in}, C_{NO_2,in}) + \quad \text{(VIII)}$$

$$\vec{L}(C_{NO,meas} + C_{NO_2,meas} - C_{NO,est} - C_{NO_2,est})$$

to estimate $\theta$ and the concentrations of NO, $NO_2$, and $NH_3$ downstream from the SCR catalyst. $\vec{L}$ serves to stabilize the estimator. That is, when the system begins, it is necessary to employ an estimate for the NO and $NO_2$, however, once the system is running, the measured and estimated values of NO and $NO_2$ should converge, and $\vec{L}$ will consequently disappear. The estimator's ability to predict concentrations of NO, $NO_2$, and $NH_3$ was verified experimentally, as described hereafter in Example 1.

For some applications, it may be computationally expensive to estimate the four states using equation VIII. In an alternative embodiment, an acceptable estimate may be obtained quicker and/or with less computational resources by solving $\dot{C}_{NO}$, $\dot{C}_{NO_2}$, and $\dot{C}_{NH_H}$ as steady state expressions. This approximation results in a single state model for the fractional $NH_3$ coverage in the catalyst $$\dot{\theta} = -(k_6+k_4)\theta + k_5 C_{NH_3} - k_1 C_{NO} C_{NO_2}\theta - k_2 C_{NO} C_{O_2}\theta - k_3 C_{NO_2}\theta - k_5 \theta C_{NH_3} \quad \text{(IX)}$$

and a corresponding linear state estimator of the form $$\dot{\theta}_{est} = \vec{f}(C_{NO}, C_{NO_2}, \theta, C_{NH_3}, C_{NO,in}, C_{NO_2,in}, C_{NH_3,in}) + \vec{L}(C_{NO_x,meas} - C_{NO_x,est}) \quad \text{(X)}$$

where $C_{NO_x,meas}$ is the measurement from the $NO_x$ sensor 16. Because the $NO_x$ sensor is cross-sensitive to $NH_3$, $C_{NO_x,est}$ must actually incorporate an estimate of the downstream $NH_3$ concentration. Thus, $C_{NO_x,est}$ is $$C_{NO_x,est} = A_1 C_{NO} + A_2 C_{NO_2} + A_3(\alpha) C_{NH_3} \quad \text{(XI)}$$

where $A_1$, $A_2$, and $A_3(\alpha)$ are specific to the aftertreatment control system.

The initial concentrations of NO and $NO_2$ are calculated by estimator 70 using a model specific for internal combustion engine 15 and additional emission equipment that may lie between internal combustion engine 15 and SCR 35 (e.g. a catalyzed particulate filter). Onboard diagnostic unit 60 reports engine parameters, such as engine speed, load, exhaust gas temperatures, flow rates and exhaust gas pressure, to estimator 70. Estimator 70 uses these engine parameters to produce an estimate of NO and $NO_2$ concentrations for the purpose of estimating $C_{NO_x}$. Estimator 70 also estimates the $NH_3$ entering SCR catalyst 35 based upon the rate that urea injector 30 is injecting atomized urea solution 25 into exhaust stream 20 previous to urea-enriched exhaust 32 entering SCR catalyst 35.

Controller 80 functions to minimize the NO, $NO_2$, and $NH_3$ in scrubbed exhaust stream 37 while using as little atomized urea solution 25 as necessary. The controller's efficiency at converting NO and $NO_2$ to $N_2$ per mole of $NH_3$ can be expressed as $$\eta_T = \frac{C_{NO,in} + C_{NO_2,in} - C_{NO,out} - C_{NO_2,out} - \lambda C_{NH_3,out}}{C_{NO,in} + C_{NO_2,in}} \quad \text{(XIII)}$$

wherein $\lambda$ accounts for $NH_3$ slipping out of the catalyst.

Defining a new function $e_{\bar{p}} = \bar{p}_{des} - \bar{p}$, where $\bar{p}$ is a linear combination of $C_{NO}$, $C_{NO_2}$, $C_{NH_3}$, and $\bar{p}_{des}$ is a linear combination of the desired concentrations, i.e., $\bar{p}_{des} = C_{NO,des} + C_{NO_2,des} + \alpha C_{NH_3,des}$, the controller's goal can be represented as $e_{\bar{p}} = \dot{e}_{\bar{p}} = 0$.

Substituting $\eta_T = 1 - \bar{p}_{des}$, the dynamic concentration of $NH_3$ within the SCR catalyst 15 for the goal $e_{\bar{p}} = \dot{e}_{\bar{p}} = 0$ can be expressed as, $$C_{NH_3,in,dyn} = C_{NH_3,est} + \frac{1}{\lambda}(C_{NO,est} + C_{NO_2,est} - C_{NO,in} - C_{NO_2,in}) + \quad \text{(XIV)}$$

$$\frac{1}{Q}(k_5\Omega(1-\theta_{est})C_{NH_3,est} - k_6\Omega\theta_{est}) +$$

$$\frac{1}{\lambda Q}(\dot{\bar{p}}_{des} + 2\Omega\theta_{est}k_1 C_{NO,est} C_{NO_2,est} +$$

$$\Omega\theta_{est}k_2 C_{NO,est} C_{O_2} + \Omega\theta_{est}k_3 C_{NO_2,est})$$

As the system, in accordance with the invention, is subject to nonlinear dynamics, controller 80 must employ an additional correction term to ensure stability in the event of measurement errors or other transient disturbances. Therefore, an additional term is added that penalizes deviations from the objective $e_{\bar{p}} = 0$.

$$C_{NH_3,in} = C_{NH_3,in,dyn} - \Gamma \text{sgn}(e_{\bar{p}}) \quad \text{(XV)}$$

where $\Gamma$ is a control variable that can be tuned to meet the control objective. Based upon the sign of $\text{sgn}(e_{\bar{p}})$, the signum function changes:

$$\text{sgn}(x) = \begin{Bmatrix} -1: x < 0 \\ 0: x = 0 \\ 1: x > 0 \end{Bmatrix} \quad \text{(XVI)}$$

Thus, given estimates of NO, $NO_2$, $NH_3$ and free catalytic sites from estimator 70, controller 80 calculates the optimum concentration of ammonia to achieve its efficiency goals. Upon calculating this value, controller 80 adjusts the rate of injection of atomized urea solution 25 from injector 30 assuming a 2:1 molar ratio of ammonia to atomized urea solution 25.

As an alternative to $NO_x$ sensor 40 downstream of SCR catalyst 35, an $NH_3$ sensor 140 can be used for SCR control applications. See FIG. 3. $NH_3$ sensor 140 has the additional, beneficial, characteristic of having minimal cross-sensitivity toward NO and $NO_2$ species, as is reported in the literature (See Wang, DEER 2007; Moos, *Sensors and Actuators*, 2002.) Because of the minimal cross-sensitivity, ammonia-sensor-based exhaust aftertreatment system 110 requires fewer variables than exhaust aftertreatment system 10, employing $NO_x$ sensor 40.

Figure 3:
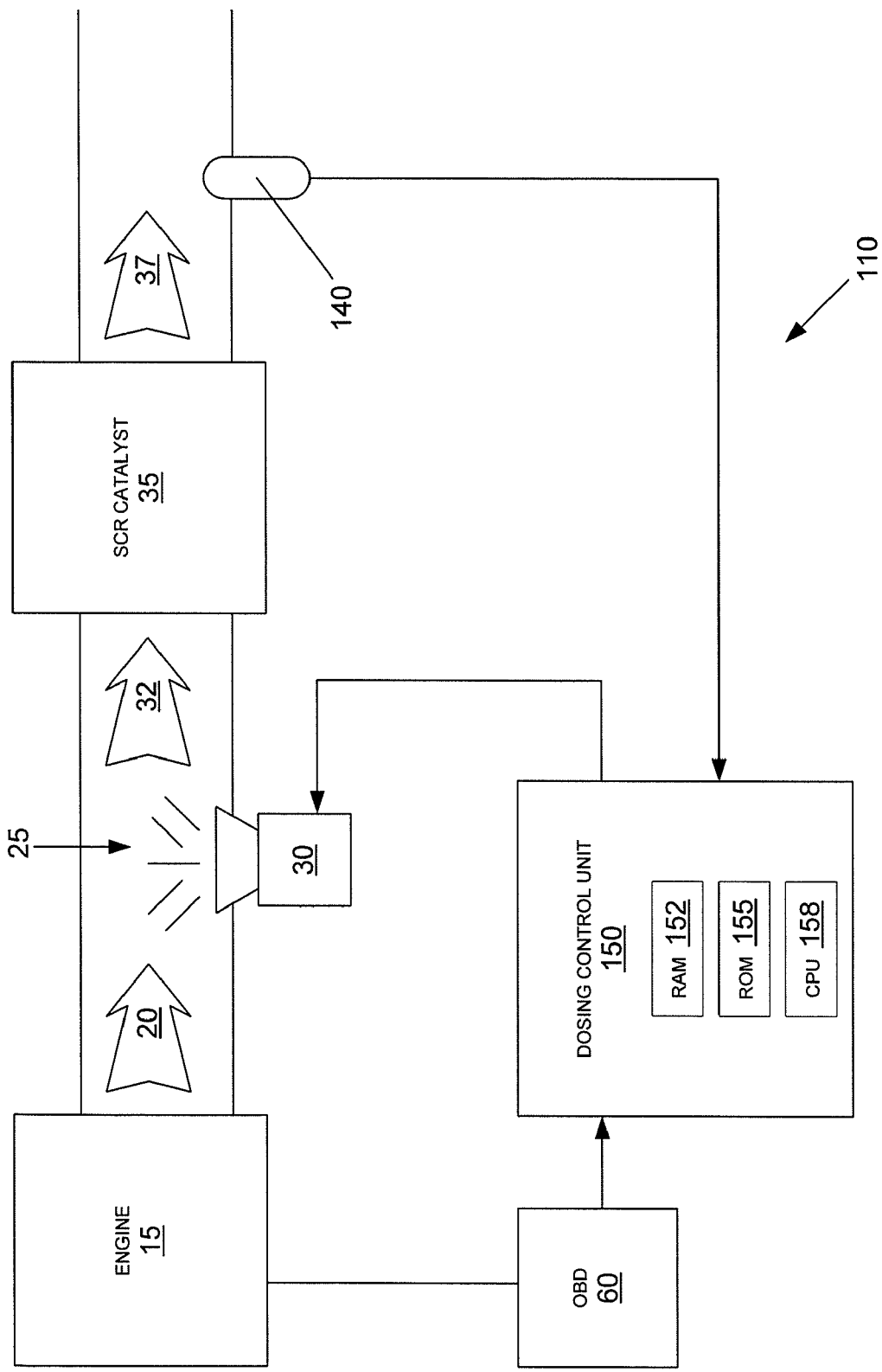
FIG. 3 is a block diagram of an embodiment of an exhaust aftertreatment control system using a $NH_3$ sensor.

FIG. 3 is a block diagram depicting an ammonia-sensor-based exhaust aftertreatment system 110 embodying the principles of the invention for catalytic reduction of $NO_x$ in the presence of ammonia. The ammonia-sensor-based exhaust aftertreatment system 110 includes urea injector 30, SCR catalyst 35, an $NH_3$ sensor 140, and an ammonia-sensorbased dosing control unit 150. Internal combustion engine 15 produces exhaust stream 20 containing nitrogen oxides, including NO and $NO_2$. As exhaust stream 20 moves through the ammonia-sensor-based aftertreatment system 110, exhaust stream 20 is mixed with atomized urea solution 25 from urea injector 30 to create urea-enriched exhaust 32. Urea-enriched exhaust 32 then enters SCR catalyst 35. SCR catalyst 35 contains metal zeolites arranged in a honeycomb such that the passing exhaust gasses will interact with a multitude of catalytic sites. As urea-enriched exhaust 32 is swept into SCR catalyst 35, the urea breaks down into ammonia ($NH_3$) and carbon dioxide ($CO_2$). Once inside SCR catalyst 35, the nitrogen oxides react with ammonia in the presence of the metal zeolites to produce nitrogen gas ($N_2$) and water vapor ($H_2O$). $NH_3$ sensor 140 measures the $NH_3$ exiting SCR catalyst 35, providing a signal indicating the concentration of $NH_3$ in scrubbed exhaust stream 37 to the ammonia-sensor-based dosing control unit 150. Ammonia-sensor-based dosing control unit 150 uses the measured $NH_3$ concentration, as well as internal combustion engine 15 operating parameters, which originate from OBD 60. Engine parameters may include exhaust gas temperature, speed, load, air-flow rate, fuel-flow rate and/or exhaust gas pressure. Ammonia-sensor-based dosing control unit 150 then calculates the rate at which the atomized urea solution 25 should be mixed with exhaust stream 20, and adjusts injector 30 accordingly.

Figure 4:
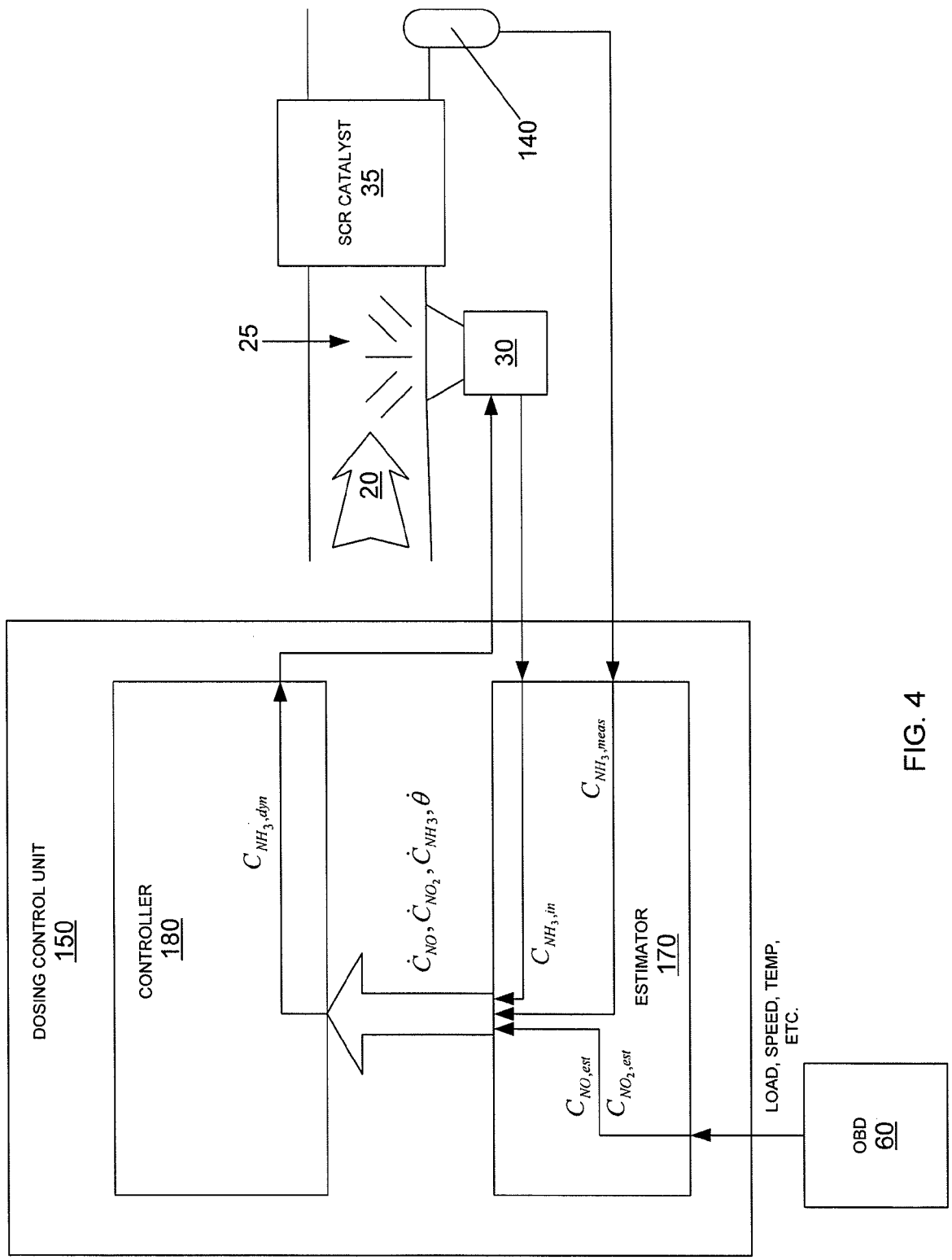
FIG. 4 is a block diagram of an embodiment of a dosing control unit for the exhaust aftertreatment control system FIG. 3.

Ammonia-sensor-based dosing control unit 150 is an electronic control unit comprising random access memory (RAM) 152, read only memory (ROM) 155, and a microprocessor (CPU) 158. Functionally, the ammonia-sensor-based dosing control unit 150 may be described as comprising an ammonia-sensor-based estimator 170 and an ammonia-sensor-based controller 180. The functions of ammonia-sensor-based estimator 170 and ammonia-sensor-based controller 180 are illustrated in FIG. 4. Ammonia-sensor-based estimator 170 collects information about the engine from OBD 60, as well as information from $NH_3$ sensor 140. Using this information, ammonia-sensor-based estimator 170 estimates the concentration of NO, $NO_2$, and $NH_3$ in exhaust stream 20, prior to exhaust stream 20 entering SCR catalyst 35. Ammonia-sensor-based estimator 170 also estimates the $NH_3$ loading, $\theta$, in the catalyst using equation VIII, discussed above. Ammonia-sensor-based controller 180 then uses the estimated $NH_3$ loading and the NO, $NO_2$ and $NH_3$ concentrations as inputs to equation XIV, described previously. Ammonia-sensor-based controller 180 then adjusts the rate at which atomized urea solution 25 is injected into exhaust stream 20 to minimize NO, $NO_2$ and $NH_3$ in scrubbed exhaust stream 37.

Ammonia-sensor-based estimator 170 employs the same four-state model, described above with respect to equations (I)-(VII), to estimate the concentrations of NO, $NO_2$ and $NH_3$ within SCR catalyst 35. However, ammonia-sensor-based estimator 170 employs a modified converging linear state equation of the form $$\begin{Bmatrix} \dot{C}_{NO,est} \\ \dot{C}_{NO_2,est} \\ \dot{\theta}_{est} \\ \dot{C}_{NH_3,est} \end{Bmatrix} = \vec{f}(C_{NO,est}, C_{NO_2,est}, \theta_{est}, C_{NH_3,est}, C_{NO,in}, C_{NO_2,in}) + \vec{L}(C_{NH_3,meas} - C_{NH_3,est}) \quad \text{(XVII)}$$

to estimate $\theta$ and the concentrations of NO, $NO_2$, and $NH_3$ downstream from the SCR catalyst. $\vec{L}$ serves to stabilize the estimator. That is, when the system begins, it is necessary to employ an estimate for the $NH_3$, however, once the system is running, the measured and estimated values of $NH_3$ should converge, and $\vec{L}$ will consequently disappear.

For some applications, it may be computationally expensive to estimate the four states using equation XVII. In an alternative embodiment, an acceptable estimate may be obtained quicker and/or with less computational resources by solving $\dot{C}_{NO}$, $\dot{C}_{NO_2}$, and $\dot{C}_{NH_H}$ as steady state expressions. Using equation (IX), above, to describe a single state model for the fractional $NH_3$ coverage in the catalyst, a corresponding linear state estimator for the use of an $NH_3$ sensor 140 can be determined $$\dot{\theta}_{est} = \vec{f}(C_{NO}, C_{NO_2}, \theta_{est}, C_{NH_3}, C_{NO,in}, C_{NO_2,in}, C_{NH_3,in}) + \vec{L}(C_{NH_3,meas} - C_{NH_3,est}) \quad \text{(XVIII)}$$

where $C_{NH_3,meas}$ is the $NH_3$ concentration measured by the $NH_3$ sensor 140, and $C_{NH_3,est}$ is calculated based upon an $NH_3$ sensor model given by $$C_{NH_3,est} = A_3(\alpha) C_{NH_3} \quad \text{(XIX)}$$

where $A_3$ is determined as a function of $\alpha$, which is specific to ammonia-sensor-based aftertreatment control system 110.

The initial concentrations of NO and $NO_2$ are calculated by ammonia-sensor-based estimator 170 using a model specific for internal combustion engine 15 and additional emission equipment that may lie between internal combustion engine 15 and SCR 35 (e.g. a catalyzed particulate filter). OBD 60 reports engine parameters, such as engine speed, load, exhaust gas temperatures, flow rates and exhaust gas pressure, to ammonia-sensor-based estimator 170. Ammonia-sensor-based estimator 170 uses these engine parameters to produce an estimate of NO and $NO_2$ concentrations for the purpose of estimating $C_{NH_3}$. The estimator also estimates the $NH_3$ entering SCR catalyst 35 based upon the rate that urea injector 30 is injecting atomized urea solution 25 into the exhaust stream previous to entering SCR catalyst 35.

Ammonia-sensor-based controller 180 functions to minimize the NO, $NO_2$, and $NH_3$ leaving the aftertreatment system, while using as little atomized urea solution 25 as necessary, as is described in equation (XIII) above. However, because $NH_3$ sensor 140 measures the $NH_3$ slip directly, it is unnecessary to calculate a dynamic $NH_3$ concentration after the SCR as is done in the $NO_x$-sensor-based exhaust aftertreatment system 10. Thus, given estimates of NO, $NO_2$, $NH_3$ and free catalytic sites from ammonia-sensor-based estimator 170, ammonia-sensor-based controller 180 can calculate the optimum concentration of ammonia to achieve its efficiency goals. Upon calculating this value, ammonia-sensor-based controller 180 adjusts the rate of atomized urea solution 25 injection from injector 130 assuming a 2:1 molar ratio of ammonia to atomized urea solution 25.

EXAMPLE 1

Verification of Four-State Model

Figure 5:
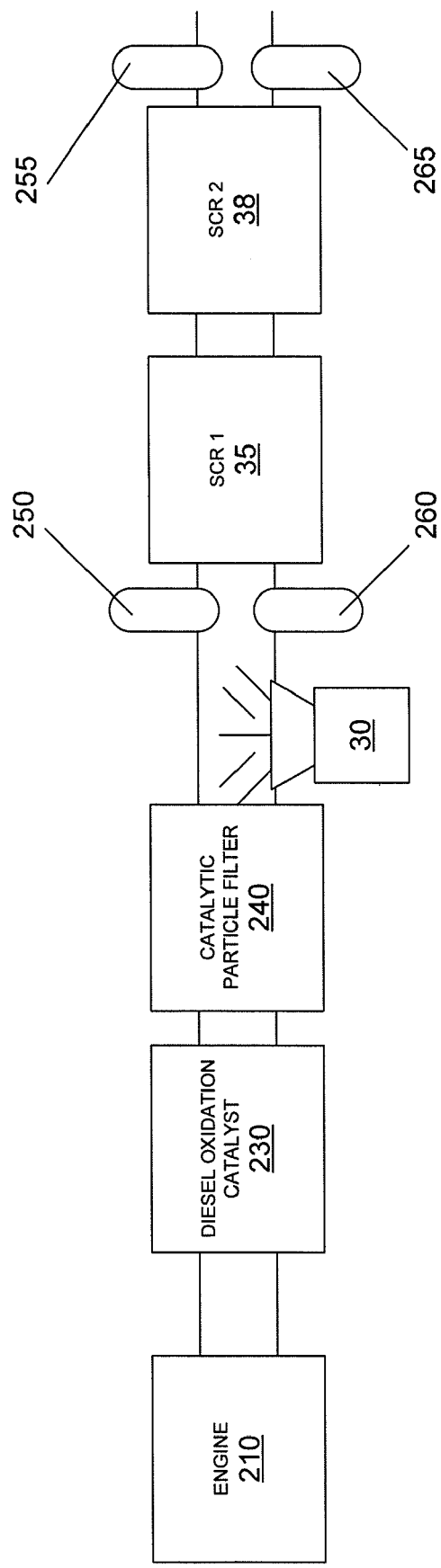
FIG. 5 depicts an experimental setup used to verify an estimator.

FIG. 5 depicts an experimental setup in accordance with the invention. A Navistar I6 7.6 L diesel engine 210 was connected to a diesel oxidation catalyst 230 and a catalyzed particulate filter 240, and then outfitted with urea injector 30 and a first SCR catalyst 35 and a second SCR catalyst 38. [Generally an exhaust aftertreatment system would have only one SCR catalyst, as is depicted in FIG. 1.] The exhaust concentrations of NO and $NO_2$ were measured before first SCR catalyst 35 with a first emission test bench 250 and after second SCR catalyst 38 with a second emission test bench 255. The $NH_3$ concentrations were measured before first SCR catalyst 35 with a first Fourier Transform Infrared Spectrometer (FTIR) 260 and after second SCR catalyst 38 with a second Fourier Transform Infrared Spectrometer (FTIR) 265.

Figure 6:
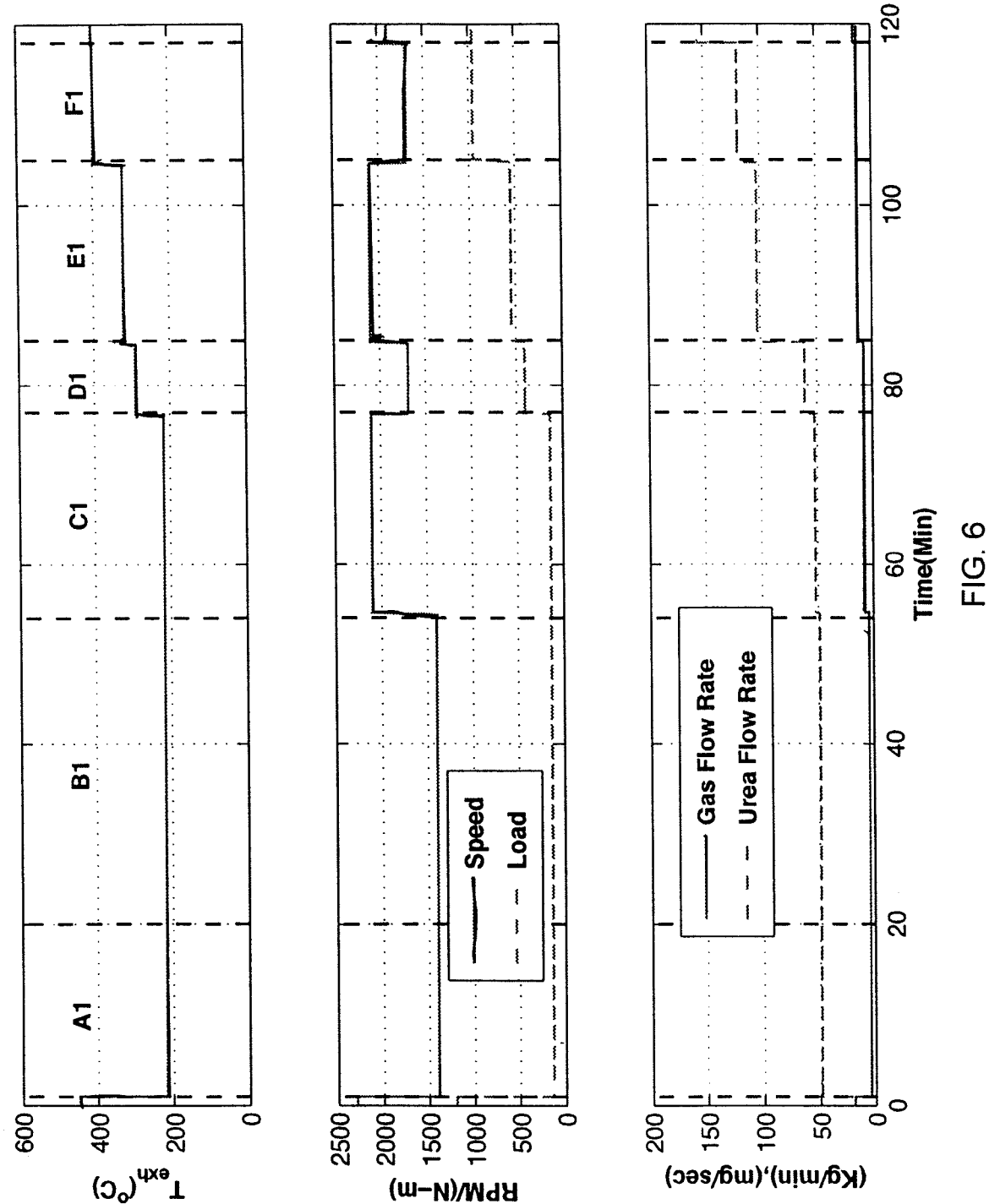
FIG. 6 shows the engine conditions used to test the four-state model in Example 1, described hereafter.
Figure 7:
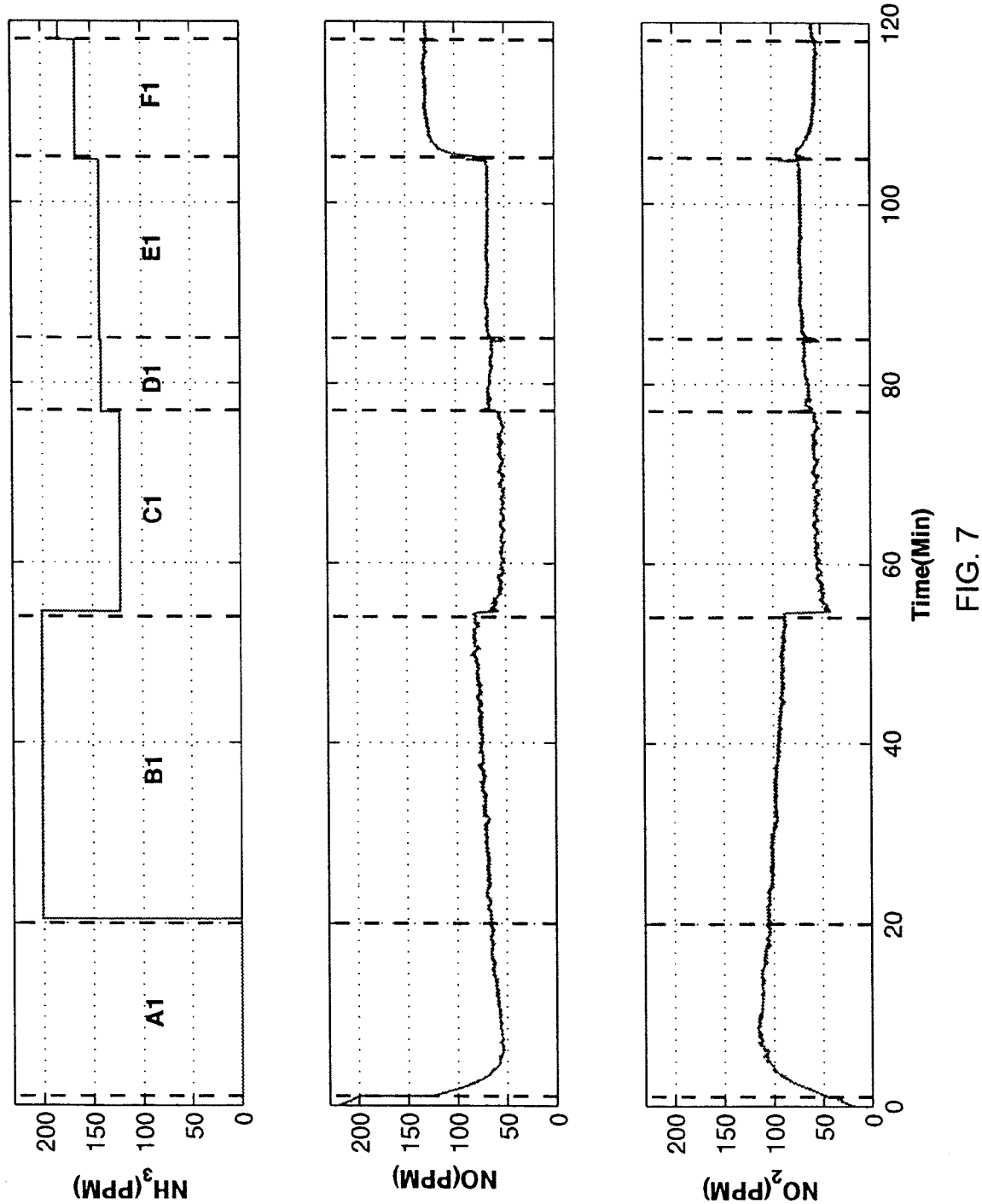
FIG. 7 shows the measured NO, $NO_2$, and $NH_3$ input concentrations in Example 1, described hereafter.

Engine 210 was run at a variety of speed and load conditions as shown in FIG. 6, resulting in a variety of engine temperatures and exhaust gas flow rates. The rate of urea injection was adjusted manually. FIG. 7 shows the NO and $NO_2$ concentrations measured with first emission test bench 250 during the engine conditions depicted in FIG. 6. The $NH_3$ concentration in FIG. 7 was calculated from the rate of urea injection in FIG. 6.

The resulting NO and $NO_2$ concentrations were measured with second emission test bench 255. The resulting $NH_3$ concentrations were measured with second FTIR 265. These measurements are illustrated with dashed lines in FIG. 8. For comparison, the NO, $NO_2$, and $NH_3$ concentrations after first and second SCR catalysts 35 and 38 were estimated using the four state model (Equation VIII), engine 210 parameters, and the rate of urea solution injection. The estimated concentrations are depicted with a solid line.

Figure 8:
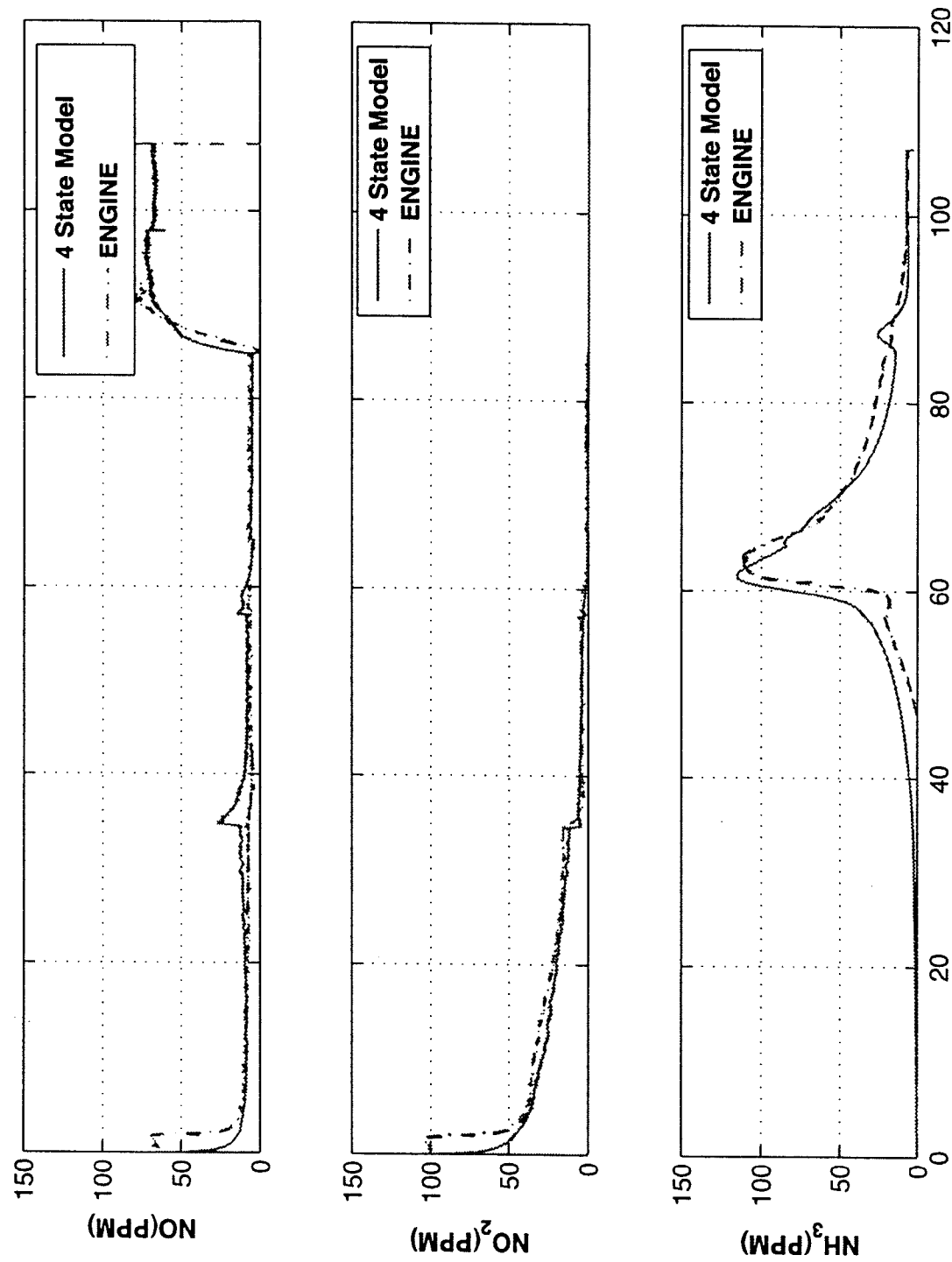
FIG. 8 compares the estimated NO, $NO_2$, and $NH_3$ output concentrations to experimental data in Example 1, described hereafter.

As illustrated in FIG. 8, the four-state model provides a suitable method for estimating NO, $NO_2$, and $NH_3$ concentrations.

Figure 9:
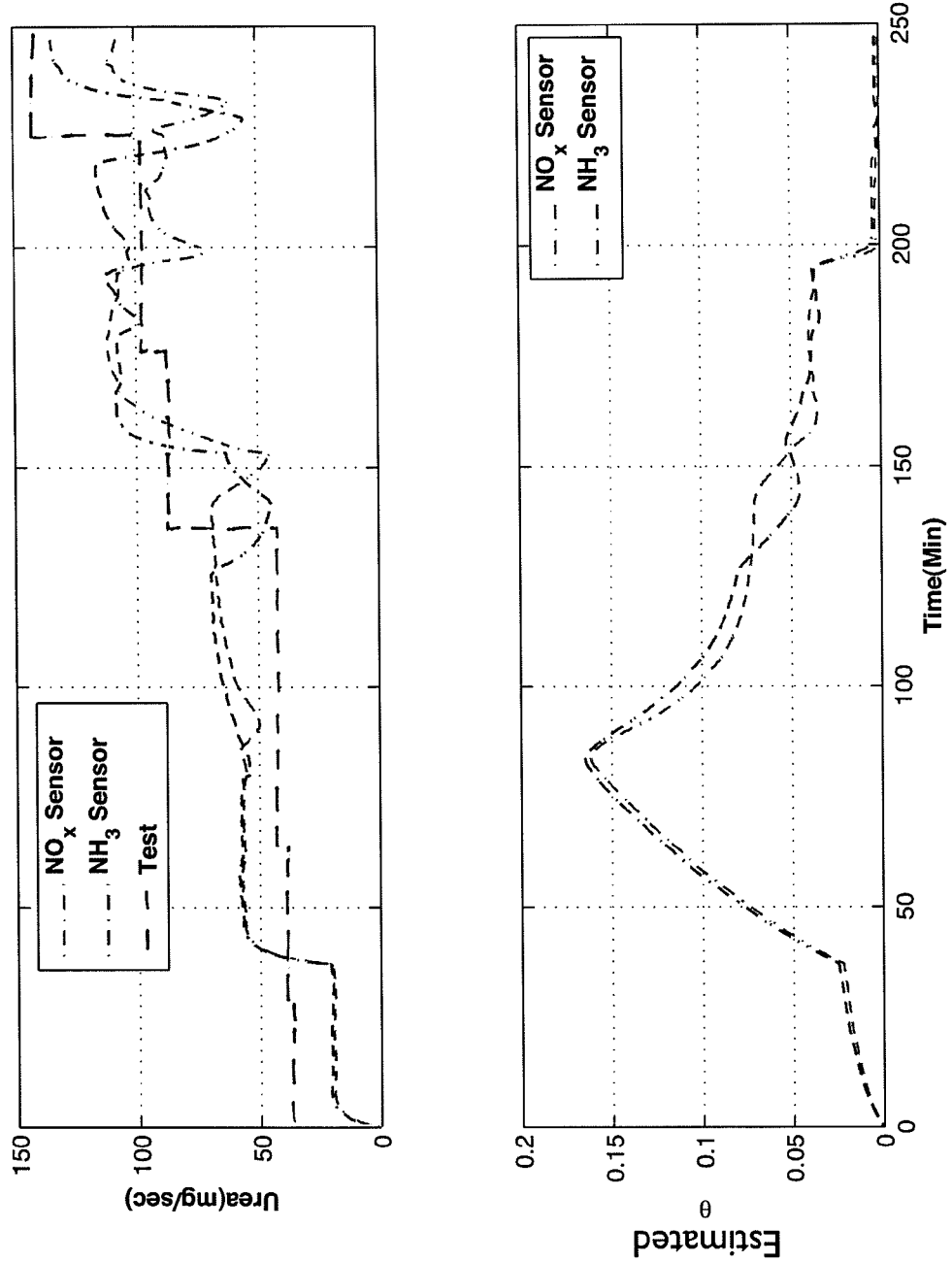
FIG. 9 compares urea consumption and fractional surface coverage of the SCR catalyst by $NH_3$ for a $NO_x$-sensor-based and a $NH_3$-sensor-based exhaust aftertreatment system.

As a final verification of the robustness of the invention described herein, the $NO_x$ sensor model, described by equation (VIII) was used to control the rate of urea injection in the setup shown in FIG. 5, and then the $NH_3$ sensor model, described by equation (XVII) was used to control the rate of urea injection in a similar experimental setup. As can be seen in FIG. 9, both sensor models result in similar rates of urea injection and fractional surface coverage, θ, of the SCR catalyst by $NH_3$.

EXAMPLE 2

Controlling $NO_x$ Emissions From Industrial Burner

Figure 10:
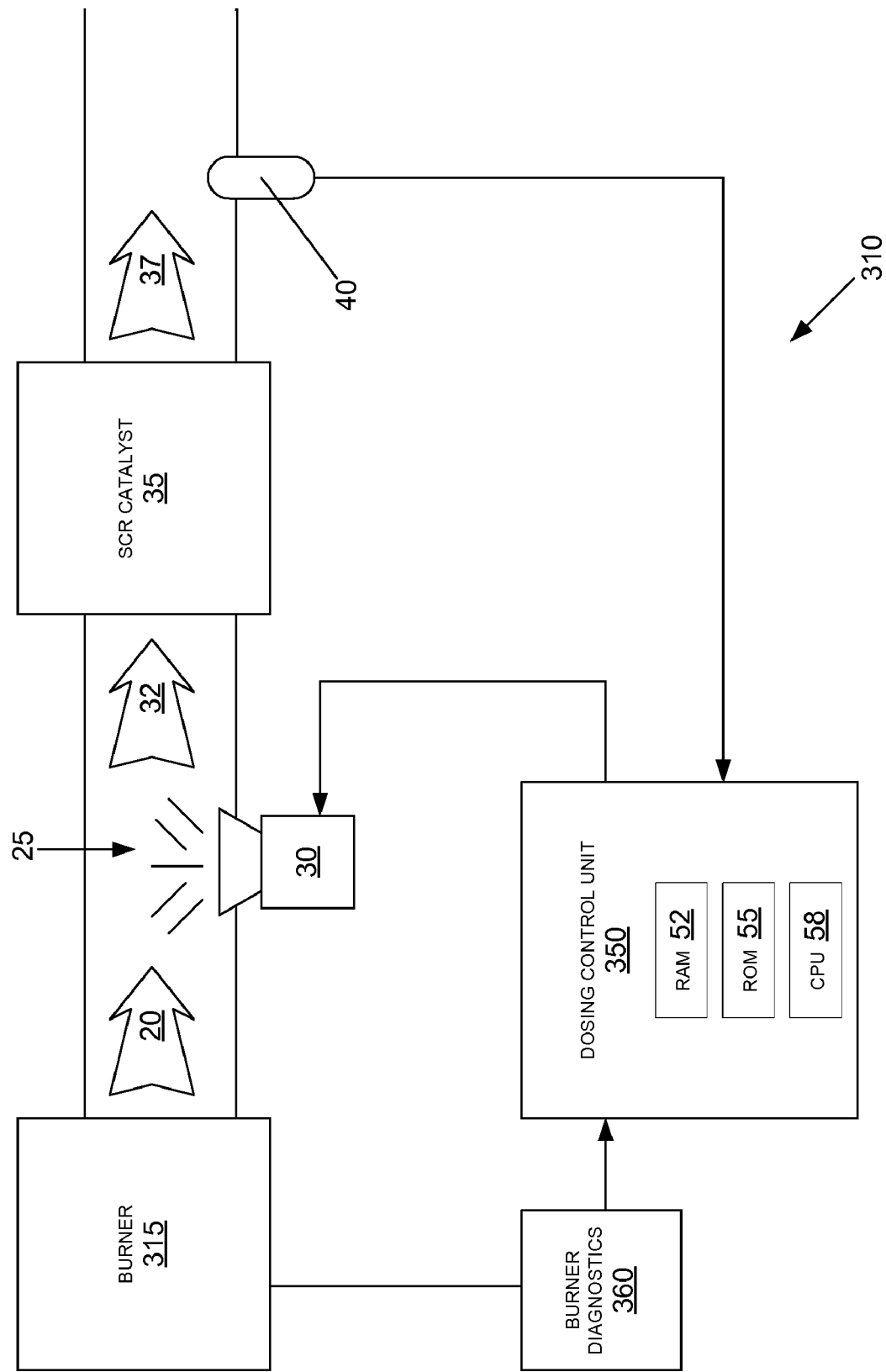
FIG. 10 is a block diagram of an embodiment of an exhaust aftertreatment control system using a $NO_x$ sensor.

FIG. 10 is a block diagram of a prophetic embodiment of an exhaust aftertreatment system 310 employing a $NO_x$ sensor according to the principles of the invention. The exhaust aftertreatment system 310 will include a urea injector 30, a selective catalytic reduction (SCR) catalyst 35, a $NO_x$ sensor 40, and a dosing control unit 50. An oil-fueled industrial burner 315 (used to power a 66 MW steam generator) will produce an exhaust stream 20 containing nitrogen oxides, including NO and $NO_2$. Exhaust stream 20 will move through aftertreatment system 310, exhaust stream 20 will be mixed with an atomized urea solution 25 from urea injector 30 to create urea-enriched exhaust 32. Urea-enriched exhaust 32 will then enter SCR catalyst 35. SCR catalyst 35 will contain metal zeolites arranged in a honeycomb such that the passing exhaust gasses will interact with a multitude of catalytic sites. As urea-enriched exhaust 32 is swept into SCR catalyst 35, the urea will break down into ammonia ($NH_3$) and carbon dioxide ($CO_2$). Once inside SCR catalyst 35, the nitrogen oxides will react with ammonia in the presence of the metal zeolite to produce nitrogen gas ($N_2$) and water vapor ($H_2O$). $NO_x$ sensor 40 will measure the $NO_x$ in a scrubbed exhaust stream 37 exiting SCR catalyst 35, and will provide a signal indicating the concentration of $NO_x$ to dosing control unit 350. Dosing control unit 350 will use the measured $NO_x$ concentration, as well as operating parameters from industrial burner 315, which will originate from a burner diagnostics unit 360. Operating parameters will include exhaust gas temperature, steam load, steam temperature, air-flow rate, fuel-flow rate and exhaust gas pressure. Dosing control unit 350 then will calculate the rate at which atomized urea solution 25 will be mixed with exhaust stream 20, and will adjust urea injector 30 accordingly. Dosing control unit 350 is an electronic control unit comprising random access memory (RAM) 52, read only memory (ROM) 55, and a microprocessor (CPU) 58. Functionally, dosing control unit 350 will be nearly identical to dosing control unit 50, shown in FIG. 2. Dosing control unit will be programmed to estimate the concentration of $NO_x$ in exhaust stream 20 based upon empirical measurements of $NO_x$ in exhaust stream 20 under various operating conditions.

Thus, the invention provides systems and methods for the reduction of $NO_x$ emissions from a combustion process by measuring engine parameters and concentrations of $NO_x$ or $NH_3$, estimating NO and $NO_2$ concentrations, injecting a urea solution into the exhaust stream, and selectively reducing $NO_x$ to $N_2$ in the presence of a catalyst. The methods and systems minimize urea solution consumption at the same time they minimize $NO_x$ and ammonia emissions.

The above embodiments and examples do not serve as limitations on the invention, as other embodiments may employ the principles of the invention described herein. For example, the principles of the invention may be employed to create an exhaust aftertreatment system for $NO_x$ reduction in industrial burners, such as those used in furnaces, boilers, or power plants. These burners may be powered by a variety of fuels, including, but not limited to, natural gas, heating oil, biomass, or municipal solid wastes.

Furthermore, Example 1 does not indicate that the invention is limited to diesel engines such as those used for over-the-road trucking. With only minor modifications, one skilled in the art could apply the principles of the invention described herein to reduce $NO_x$ emissions from any diesel powered vehicle or equipment, including locomotives, construction equipment, earthmoving equipment, or marine craft.

All publications, patents, and patent applications are herein expressly incorporated by reference to the same extent as if each individual publication, patent, or patent application was specifically and individually indicated by reference. In case of conflict between the present disclosure and the incorporated patents, publications and references, the present disclosure should control.

Various features and advantages of the invention are set forth in the following claims.

What is claimed is:

1. An exhaust aftertreatment control system for exhaust gases, comprising:
    a selective catalytic reduction (SCR) catalyst in fluid communication with an exhaust stream from an engine,
    a urea solution injector, upstream of the SCR catalyst, in fluid communication with the exhaust stream;
    a gas sensor, downstream of the SCR catalyst, in fluid communication with the exhaust stream;
    a diagnostic unit, operatively connected to the engine; and
    a dosing control unit, operatively connected to the gas sensor, the urea solution injector, and the diagnostic unit, wherein the dosing control unit receives a signal indicative of NO, $NO_2$ or $NH_3$ concentrations from the gas sensor, receives a signal indicative of engine operating parameters from the diagnostic unit, converts the engine operating parameters to a NO concentration and a $NO_2$ concentration, estimates a NO concentration downstream from the SCR catalyst, estimates a $NO_2$ concentration downstream from the SCR catalyst, estimates the fractional surface coverage of $NH_3$ in the SCR catalyst, calculates a quantity of urea solution needed to minimize $NO_x$ emissions, and signals the urea solution injector to inject the quantity of the urea solution into the exhaust stream.

2. The exhaust aftertreatment control system of claim 1, wherein the gas sensor is a $NO_x$ sensor.

3. The exhaust aftertreatment control system of claim 1, wherein the gas sensor is an $NH_3$ sensor.

4. The exhaust aftertreatment control system of claim 1, wherein the engine is a diesel engine.

5. The exhaust aftertreatment control system of claim 1, wherein the engine parameters are selected from the group consisting of engine speed, engine load, engine temperature, exhaust gas temperature, exhaust flow rate, and exhaust pressure.

6. The exhaust aftertreatment control system of claim 1, wherein the dosing control unit uses a converging linear state equation to calculate the quantity of urea solution needed to minimize $NO_x$ emissions.

7. The exhaust aftertreatment control system of claim 1, wherein the selective catalytic reduction catalyst is chosen from the group consisting of vanadium compounds, iron compounds, copper compounds, and metal zeolites.

8. An exhaust aftertreatment control system for exhaust gases, comprising:
 a selective catalytic reduction (SCR) catalyst in fluid communication with an exhaust stream from a burner,
 a urea solution injector, upstream of the SCR catalyst, in fluid communication with the exhaust stream;
 a gas sensor, downstream of the SCR catalyst, in fluid communication with the exhaust stream;
 a burner diagnostic unit, operatively connected to the burner; and
 a dosing control unit, operatively connected to the gas sensor, the urea solution injector, and the burner diagnostic unit, wherein the dosing control unit receives a signal indicative of NO, $NO_2$ or $NH_3$ concentrations from the gas sensor, receives a signal indicative of burner operating parameters from the burner diagnostic unit, converts the burner operating parameters to NO and $NO_2$ concentrations, estimates a NO concentration and a $NO_2$ concentration downstream from the SCR catalyst, estimates the fractional surface coverage of $NH_3$ in the SCR catalyst, calculates a quantity of urea solution needed to minimize $NO_x$ emissions, and signals the urea solution injector to inject the quantity of the urea solution into the exhaust stream.

9. The exhaust aftertreatment control system of claim 8, wherein the gas sensor is a $NO_x$ sensor.

10. The exhaust aftertreatment control system of claim 8, wherein the gas sensor is an $NH_3$ sensor.

11. The exhaust aftertreatment control system of claim 8, wherein the burner is supplied with a fuel selected from the group consisting of natural gas, heating oil, biomass, or municipal solid waste.

* * * * *